July 21, 1970  N. HELMSCHROTT ET AL  3,521,291

RECORDING APPARATUS FOR A MOTORCAR

Filed Jan. 31, 1969

Inventors
Norbert Helmschrott
Karl Vögtlin

United States Patent Office 3,521,291
Patented July 21, 1970

3,521,291
RECORDING APPARATUS FOR A MOTORCAR
Norbert Helmschrott, Schwenningen, and Karl Vögtlin, Villingen, Germany, assignors to Kienzle Apparate GmbH, Villingen, Black Forest, Germany
Filed Jan. 31, 1969, Ser. No. 795,567
Claims priority, application Germany, Feb. 3, 1968, 1,574,557
Int. Cl. G01d 9/12
U.S. Cl. 346—7                                                    10 Claims

ABSTRACT OF THE DISCLOSURE

A vibratory pendulum is oscillated by vibrations of a motorcar to stepwise turn a wheel driving a cam by which recording means are oscillated to record a zigzag line on a moving record carrier. The number of cam lobes is selected so that the oscillation frequency of the recording means is lower than the oscillation frequency of the pendulum, or of other speed responsive actuating means by which the wheel and cam are driven.

BACKGROUND OF THE INVENTION

The present invention relates to recording apparatus of the type which records a zigzag line forming a bar-shaped recording on a continuously moving record carrier driven by a clockwork. Recording apparatus of this type are particularly used for motorcars for indicating by the bar-shaped recording the time of actual use of the motorcar, but the apparatus can also be used for recording the time during which other machines are operated. Recording apparatus of this type includes a vibratory pendulum responsive to the vibration of the moving motorcar or machine to oscillate or operate the recording means of the apparatus. Bar-shaped recordings are used together with recordings indicating the speed of the motorcar, and a circular thin line is recorded on a rotating record carrier when the car is at a standstill, while the bar-shaped zigzag recording is made when the motorcar moves. In this manner, it can be ascertained how long and at what time the car was operated, and when it was at a standstill. By variations of the positions of the bar-shaped zigzag recording on the record carrier, particular drivers can be associated with the recordings.

The controlling vibratory pendulum responds to accelerations, which may be caused by an uneven road in vertical direction, by speed changes in longitudinal direction of the car, and also by transverse vibrations developing when the car turns about a curve in the road.

Even if the mechanical drive of the recording instrument fails, or is interrupted in a fraudulent manner, a recording instrument provided with a vibratory pendulum permits the reliable control of the use of the motorcar.

However, recording instruments provided with vibratory pendulums have the disadvantage that they do not function equally well in all positions in which they have to be mounted in different motorcars. Also, it may occur that on good smooth roads, cars with well functioning dampening springs vibrate so little that insufficient energy is available for oscillating the vibratory pendulum with such energy that the recording means which encounter the frictional resistance of the record carrier during recording, can be properly operated, so that the bar-shaped recording may be of varying width due to a changing vibrational amplitude of the vibratory pendulum, or may be interrupted at times where the pendulum did not vibrate at all.

Such a bar-shaped zigzag recording is useless for determining the financial compensation due for individual drivers. Particularly, if the interpretation of the record carrier in view of the working times of the driver is automatically carried out by suitable apparatus, it is absolutely necessary that the amplitude of the zigzag recording, and complete continuity of the bar-shaped recording are assured.

Even if the oscillating recording means is driven by a rotary cam whose speed depends on the speed of the motorcar, and which may be driven from a wheel of the same, control over a possible fraudulent use of the car is not obtained, and at a comparatively low speed of the motorcar, the bar-shaped recording would become a spread zigzag line, which could not be automatically evaluated by the usual apparatus.

The German Pat. 1,232,379 and the corresponding U.S. Pat. 3,369,248 discloses a recording instrument in which a vibratory pendulum is freely oscillatable within stops determining the amplitude and is directly connected with the recording means for oscillating the same along a zigzag path. The pendulum and the recording means are additionally actuated by impacts produced by a resilient member reciprocated from a cam driven from the wheel of the motorcar at a rotary speed proportionate to the distance traveled by the motorcar. The provision of a vibratory pendulum which is also actuated depending on the distance traveled results in a bar-shaped zigzag recording which can be accurately evaluated by suitable apparatus, but the pendulum has to provide the force for overcoming the friction of the recording means, and the friction of the writing points on the record carrier. The energy of the vibratory pendulum must consequently be sufficient to overcome the friction encountered by the recording point, and on the other hand, to obtain an amplitude of oscillation of the pendulum which is large enough so that the recording means during each reciprocating stroke of the pendulum records the full width of the bar-shaped recording, which means that the energy of the pendulum must be sufficient to obtain an amplitude of oscillation at which the pendulum swings against the limiting stops, and rebounds from the same.

However, this is not reliably assured during slow travel of the motorcar when the drive impulses depending on the distance covered by the motorcar are slowed down. If the distance depending drive impulses on the pendulum are not produced due to mechanical failure, it is not possible to obtain the full oscillation amplitude of the pendulum. If the bar-shaped zigzag recording is to be made the basis of the calculation of the wages of the drivers, and is to be automatically evaluated, recording of the time during which the motorcar is used must be done with the greatest possible accuracy.

SUMMARY OF THE INVENTION

It is one object of the invention to overcome the disadvantages of known instruments recording bar-shaped zigzag recordings on a record carrier driven by a clockwork, and to provide a recording apparatus by which the bar-shaped recording is accurately and reliably made under all operational conditions.

Another object of the invention is to oscillate the recording means at a frequency lower than the frequency of actuating means whose oscillation is responsive to movement of the motorcar.

Another object of the invention is to operate the recording means at a frequency lower than the frequency of a vibratory pendulum which responds to vibrations of the moving motorcar.

Another object of the invention is to reduce the influence of the friction encountered by the recording means on the oscillations of a vibratory pendulum.

With these objects in view, the present invention provides a recording apparatus in which the actuating forces produced by a vibratory pendulum and/or by distance depending means, or by an electrical impulse generator, act on the recording means by means of a reduction transmission common to the actuating means so that the recording means oscillate at a lower frequency than the frequency of the stepwise movement produced by the actuating means. In the preferred embodiment of the invention, a plurality of reciprocating actuating means acts on a rotary means, such as a ratchet wheel, by which a cam operating the recording means is driven. The number of cam lobes determines the frequency of the oscillation of the recording means, which is lower than the frequency of reciprocation of the actuating means, and of the vibratory pendulum driving the same.

Broadly speaking, a recording apparatus according to the invention comprises actuating means, drive means mounted on the motorcar and responsive to movements of the same to reciprocate the actuating means at a frequency, rotary means operated by the reciprocating actuating means to turn stepwise, and operating means driven by the rotary means for oscillating the recording means at a frequency proportionate to, and lower than the frequency of reciprocation of the actuating means and of the steps of the rotary means.

A preferred embodiment of the invention comprises a vibratory pendulum having first actuating means and adapted to be reciprocated at a first frequency by oscillations of the motorcar; drive means for oscillating the second actuating means at a second frequency depending on the speed of the motorcar; rotary driven means, such as a ratchet wheel, operated by the first and second actuating means to turn stepwise; recording means for recording a bar-shaped zigzag line on a continuously moving record carrier driven by a clockwork; and operating means, such as a cam and cam follower, driven by the rotary driven means for oscillating the recording means at a frequency proportionate to, and lower than the first and second frequencies, and than the frequency of the steps of the rotary driven means.

It is a particular advantage of the invention that the vibratory pendulum is not subjected to braking forces encountered by the recording means, and that the oscillation of the pendulum cannot be braked by the actuating impulses used by the speed and distance controlled actuating means depending on the oscillation phase so that the pendulum oscillates freely and independently of the additional speed and distance responsive drive whereby stops limiting the oscillation amplitude of the vibratory pendulum and the width of the bar-shaped zigzag recording are not required, as in the prior art. The present invention further obtains the advantage, that relatively small oscillation amplitudes of the vibratory pendulum have no influence on the width of the bar-shaped zig-zag recording, and that the full desired width of the recording can be obtained even if the pendulum performs small oscillations in which event the diameter of the ratchet wheel driven by the pendulum, and the number of teeth of the same are suitably selected.

In a specific construction of the invention, an electromagnet, which can be excited by an impulse generator, is used as a mass on the free end of the vibratory pendulum, and has an armature which reciprocates at the frequency of the impulse generator to turn the ratchet wheel stepwise. The same armature also serves for turning the ratchet wheel stepwise when the pendulum oscillates, and consequently constitutes the actuating means of the pendulum.

The provision of an electromagnet and impulse generator improves the reliability of the apparatus and the whole operational conditions, and assures the recording of an accurate, easily evaluable, bar-shaped zigzag recording. Furthermore, the provision of the electromagnet and impulse generator permits the recording of time spent during the standstill of the motorcar for additional work, such as loading, repairs, and changing of tires, while the vibratory pendulum and its advantageous control function can be maintained, since no additional space is taken up by the electromagnet and its armature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
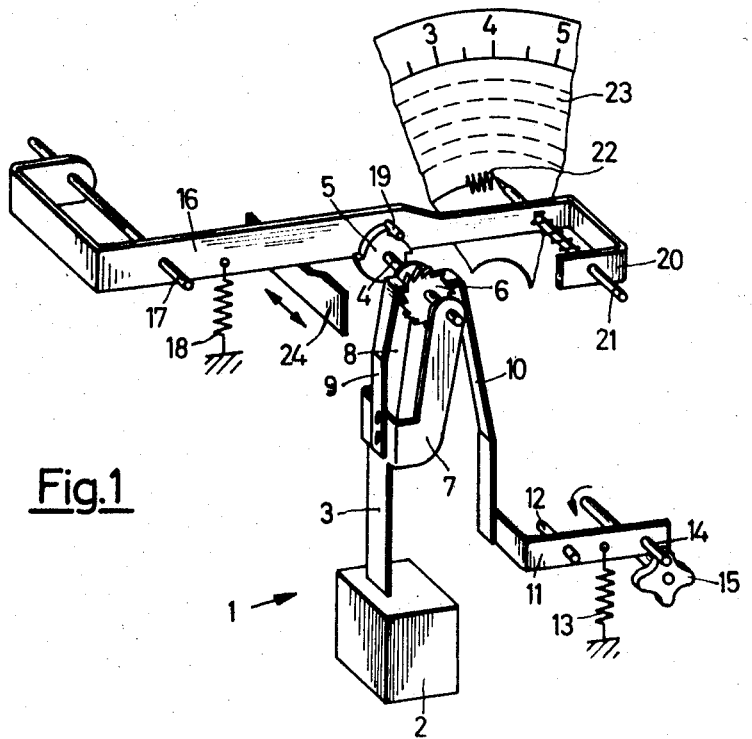
FIG. 1 is a fragmentary perspective schematic view illustrating an embodiment of the invention.

Referring first to FIG. 1, a vibratory pendulum 1 has a support including an arm 3 and a pair of bearing arms 7 and 8 supported on a shaft 4 for angular movement. A mass 2 is secured to the free end of arm 3. Shaft 4 is turnably mounted in the supporting frame, not shown, of the apparatus and carries a fixed ratchet wheel 6, and a cam drive having a plurality of cam lobes, for example four lobes, while ratchet wheel 6 has a great number of peripheral ratchet teeth cooperating with a first actuating means in the form of a resilient pawl 9 secured to the arm 3 of the vibratory pendulum 1 and oscillating with the same to advance the ratchet wheel stepwise whereby shaft 4 and cam 5 are turned.

Ratchet wheel 6 cooperates also with a second actuating means in the form of a resilient pawl 10 secured to a lever 11 which is mounted for oscillating movement on a shaft 12 which is mounted in the frame of the apparatus. A spring 13 connects the frame with lever 11 and urges the same to turn in clockwise direction until a follower pin 14 on lever 11 engages a cam 15 which is driven from a moving part of the motorcar, for example from a wheel so that the frequency of oscillations of the second actuating means 10 is proportionate to the speed of the motorcar.

During operation of the car, actuating pawls 9 and 10 both drive the rotary driven ratchet wheel 6 so that cam 5 is turned at the same speed as ratchet wheel 6.

A recording means includes a recording lever 16, and a writing point 21 resiliently mounted on a U-shaped end portion 20 of recording lever 16 which has another U-shaped end portion mounting lever 16 on a shaft 17 supported by the frame, not shown, of the apparatus. A spring 18 connects recording lever 16 with the frame and urges a follower pin 19 projecting from recording lever 16 into engagement with the peripheral cam track of cam 5 which includes the plurality of cam lobes. Recording lever 16 abuts an adjusting bar 24 under the action of spring 18, and the upper edge of the longitudinally removable adjusting bar 24 is stepped or slanted so that by longitudinal shifting of adjusting bar 24, the lower limit of the amplitude of oscillation of the recording means 16, 21 can be determined. Adjusting means 24 may be shifted mechanically or by an electromagnet, not shown, and may act on a pin, not shown, secured to recording lever 16 instead of cooperating with the lower edge of recording lever 16, as shown in FIG. 1.

During each revolution of cam 5, which has four cam lobes, recording means 16, 21 is four times raised by a lobe of cam 5, and four times moved down by spring 18 so that recording point 21 draws a bar-shaped zigzag line 22 on a record carrier sheet 23 which is rotated at uniformed speed by a clockwork, not shown, and turns one revolution during twenty-four hours, for example. Consequently, a thin circular line is drawn by recording point 21 when recording means 16, 20 do not oscillate, and a bar-shaped circular zigzag recording 22 is produced when recording means 16, 22 oscillate under the control of rotary cam 5.

The operating means for recording means 21, namely cam 5 and follower 19 on recording lever 16, is driven either by the vibratory pendulum 1 and its actuating pawl 9 cooperating with the teeth of the rotary driven ratchet means 6, or by the actuating pawl 10 also rotating the driven rotary driven ratchet means 6, or by both actuating pawls 9 and 10. Since the number of oscillations of the recording means 16, 21 depends on the number of cam lobes of cam 5 which rotates at the same speed as the rotary driven ratchet means 6, the number of lobes can be selected so that the frequency of oscillation of the recording means 20, 21 is proportionally to, but lower than the frequency of the stepwise movement of the driven rotary ratchet wheel 6, and than the frequencies of precipitation of the actuating means 9 and 10. Consequently, the driven rotary ratchet means 6, shaft 4, cam 5, and follower 19 on recording lever 16, constitute a reduction transmission whose ratio can be determined by suitably selecting the number of lobes of cam 5, and which oscillates the recording means 16, 21 at an amplitude determined by the height of the cam lobes, and independent of the amplitude of oscillation of the actuating means 9 and 10.

Figure 2:
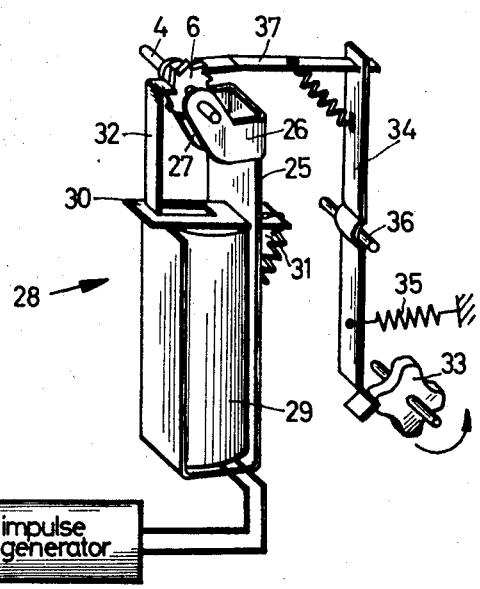
FIG. 2 is a fragmentary perspective schematic view illustrating the embodiment of FIG. 1 modified by the provision of an electromagnet.

FIG. 2 illustrates a modification of the apparatus shown in FIG. 1, and the recording means and operating means are constructed as described with reference to FIG. 1. In this embodiment, the vibratory pendulum 25 has two bearing arms 26, 27 with bearing bores through which shaft 4, passes. Cam 5, not shown, and ratchet wheel 6 are secured to shaft 4, and ratchet wheel 6 cooperates with an actuating pawl 37 which is connected by a spring to a drive lever 34 mounted for oscillatory movement on a shaft 36 carried by the frame, now shown, and biassed by a spring 35. A follower portion at the end of lever 34 is urged by spring 35 into engagement with a cam 33 corresponding to cam 15 of the embodiment of FIG. 1 and mounted on a shaft which is driven at the speed proportionate to the speed of the motorcar so that ratchet wheel 6 is stepwise turned by the actuating means 37, 34 as long as the car travels.

The lower free end of the vibratory pendulum 25 is formed at a support on which an electromagnet 29 is mounted, which provides the necessary mass at the free end of the vibratory pendulum 28. The pivotally mounted armature 30 of electromagnet 29 is biassed by a spring 31 and carries an actuating pawl 12 made of a leaf spring and having a portion cooperating with the teeth of the ratchet wheel 6.

An electric impulse generator is provided for producing impulses energizing electromagnet 29 at a predetermined frequency. The coil of electromagnet 29 is connected by a very flexible stranded wire located in the region of the axis of the shaft 4 with the impulse generator so that oscillations of the vibratory pendulum 25 do not unduly stress the connecting wires. The operation of the actuating pawl 32 by the electromagnet 29 further assures a reliable operation of the recording means, and the electromagnet 29 may be used particularly if the car is at a standstill, and work different from driving the car has to be carried out. Irrespective of the selected frequency of oscillation of the actuating pawl 32 under the control of electromagnet 29 and the impulse generator, the recording means 16, 21 are oscillated at a lower frequency depending on the number of cam lobes on cam 5.

Recordings made under the control of electromagnet 29 and the impulse generator while the car is at a standstill, are distinguishable from recordings 22 since the speed of the car is also recorded by other recording means on the record carrier 23 in a recording which is a circular line when the car is at a standstill.

It will be understood that each of the elements described above, or two or more together, may also find a useful application in other types of recording instruments for motorcars and other vibrating machines differing from the types described above.

While the invention has been illustrated and described as embodied in a recording apparatus in which the recording means are oscillated by a rotary cam so that the frequency of oscillation of the recording means depends on the number of lobes of the cam, and can be selected lower than the frequency of a vibratory pendulum oscillating at a frequency depending on the frequency of the vibrations of the car, it is not intended to be limited to the details shown, since various modifications and structural changes may be made without departing in any way from the spirit of the present invention.

What is claimed as new and desired to be protected by Letters Patent is set forth in the appended claims.

We claim:

1. Recording apparatus for a motorcar, comprising, in combination, actuating means mounted for oscillatory movement; drive means mounted on said motorcar and responsive to movements of the same to oscillate said actuating means at a frequency; rotary means operated by said oscillatory actuating means to turn stepwise oscillatory recording means; and operating means driven by said rotary means for oscillating said recording means at a frequency proportionate to, and lower than the frequency of oscillation of said actuating means and of the steps of said rotary means whereby the influence on said drive means of the frictional resistance encountered by said recording means on said record carrier is reduced.

2. Recording apparatus as claimed in claim 1 wherein said operating means includes a rotary cam driven by said rotary means and having a selected number of cam lobes, and a follower means on said recording means cooperating with said rotary cam so that the frequency of the oscillation of said recording means is proportionate to the speed of stepwise rotation of said rotary means at a reduction ratio depending on said selected number of cam lobes.

3. Recording apparatus as claimed in claim 1 wherein said drive means includes a vibratory pendulum connected with said actuating means for oscillating the same to turn said rotary means stepwise when said pendulum is vibrated by oscillations of the moving motorcar so that the frequency of oscillation of said pendulum recording means is lower than the frequency of oscillation.

4. Recording apparatus as claimed in claim 3 wherein said vibratory pendulum includes a support at the free end thereof, and an electromagnet on said support including a movable armature having said actuating means whereby said rotary means is turned when said electromagnet is energized and when said pendulum vibrates with the moving motorcar; and comprising a pulse generator for energizing said electromagnet at a predetermined frequency during standstill of the motorcar.

5. Recording apparatus as claimed in claim 1 wherein said rotary means includes a shaft, and a ratchet wheel secured to said shaft; wherein said operating means includes a rotary cam having a selected number of cam lobes, and a follower means cooperating with said cam; wherein said recording means includes a lever carrying said follower means, and recording points slidingly engaging said record carrier; and wherein said actuating means includes an actuating pawl oscillated by said drive means and cooperating with said ratchet wheel for stepwise rotating the same and thereby said rotary cam so that said recording lever is oscillated at a frequency proportionate to the speed of rotation of said ratchet wheel at a reduction ratio depending on said selected number of cam lobes and at an amplitude depending on the size of said cam lobes.

6. Recording apparatus for a motorcar, comprising in combination, a vibratory pendulum having first actuating means and adapted to be oscillated at a first frequency by oscillations of said motorcar; second actuating means; drive means for oscillating said second actuating means at a second frequency depending on the speed of the motorcar; rotary driven means operated by said first and second actuating means to turn stepwise; recording means mounted for oscillation for recording a zigzag line forming a bar-shaped recording on a continuously moving record carrier; and operating means driven by said rotary driven means for oscillating said recording means at a frequency proportionate to, and lower than said first and second frequencies, and than the frequency of the steps of said rotary driven means.

7. Recording apparatus as claimed in claim 6 wherein said operating means includes a rotary cam driven by said rotary means and having a selected number of cam lobes, and a follower means on said recording means cooperating with said rotary cam so that the frequency of the oscillation of said recording means is proportionate to the speed of stepwise rotation of said rotary means at a reduction ratio depending on said selected number of cam lobes.

8. Recording apparatus as claimed in claim 6 wherein said vibratory pendulum includes a support at the free end thereof, and an electromagnet on said support including a movable armature having said first actuating means whereby said rotary means is turned when said electromagnet is energized and when said pendulum vibrates with the moving motorcar; and comprising a pulse generator for energizing said electromagnet at a predetermined frequency during standstill of the motorcar.

9. Recording apparatus as claimed in claim 6 wherein said rotary means includes a shaft, and a ratchet wheel secured to said shaft; wherein said operating means includes a rotary cam having a selected number of cam lobes; and a follower means cooperating with said cam; wherein said recording means includes a lever carrying said follower means, and recording points slidingly engaging said record carrier; wherein said first actuating means includes a first pawl oscillating with said vibratory pendulum and cooperating with said ratchet wheel; wherein said second actuating means includes a second pawl cooperating with said ratchet wheel so that said first and second pawls stepwise rotate said ratchet wheel and thereby said rotary cam so that said recording lever is reciprocated at a frequency proportionate to the speed of rotation of said ratchet wheel at a reduction ratio depending on said selected number of cam lobes and at an amplitude depending on the size of said cam lobes; and wherein said pendulum is mounted on said shaft for oscillatory movement.

10. Recording apparatus as claimed in claim 9 wherein said recording means include spring means biasing said lever and follower means toward said rotary cam; and comprising adjustable means for limiting movement of said lever toward said rotary cam whereby the amplitude of oscillation of said lever and of said recording points can be adjusted for varying the width of said bar-shaped zigzag recording.

References Cited
UNITED STATES PATENTS

| | | | |
|---|---|---|---|
| 1,151,120 | 8/1915 | Nieman | 346—7 |
| 1,320,097 | 10/1919 | Sattler | 346—7 |
| 3,132,916 | 5/1964 | Muller | 346—8 |

JOSEPH W. HARTARY, Primary Examiner

U.S. Cl. X.R.

346—123